US009397496B2

(12) United States Patent
Kang et al.

(10) Patent No.: US 9,397,496 B2
(45) Date of Patent: Jul. 19, 2016

(54) FORCED DISCHARGE CIRCUIT OF BATTERY CHARGER FOR ELECTRIC VEHICLE, BATTERY CHARGER FOR ELECTRIC VEHICLE, AND ELECTRIC VEHICLE HAVING FUNCTION OF THE BATTERY CHARGE

(71) Applicant: MANDO CORPORATION, Pyeongtaek-si, Gyeonggi-do (KR)

(72) Inventors: Jae Jun Kang, Seongnam-si (KR); Seog Jeong Yoo, Seoul (KR); Dong Yoon Noh, Seongnam-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 231 days.

(21) Appl. No.: 14/213,552

(22) Filed: Mar. 14, 2014

(65) Prior Publication Data

US 2014/0266044 A1 Sep. 18, 2014

(30) Foreign Application Priority Data

Mar. 18, 2013 (KR) .................. 10-2013-0028613

(51) Int. Cl.
*H01M 10/46* (2006.01)
*H02H 9/04* (2006.01)
(Continued)

(52) U.S. Cl.
CPC ............ *H02H 9/045* (2013.01); *B60L 11/1811* (2013.01); *H02M 3/337* (2013.01);
(Continued)

(58) Field of Classification Search
CPC ...... H02J 2007/0067; H02J 7/24; H02J 7/244
USPC .......................... 320/104, 127, 135
See application file for complete search history.

(56) References Cited

U.S. PATENT DOCUMENTS

| | | | | |
|---|---|---|---|---|
| 2011/0221374 A1* | 9/2011 | Maebara | ........... | H02M 7/53871 318/494 |
| 2013/0181686 A1* | 7/2013 | Ueda | ..................... | G02J 7/0031 320/166 |
| 2013/0221921 A1* | 8/2013 | Ang | .................... | B60L 11/1811 320/109 |

FOREIGN PATENT DOCUMENTS

| | | |
|---|---|---|
| CN | 101814720 A | 8/2010 |
| CN | 102904322 A | 1/2013 |

(Continued)

OTHER PUBLICATIONS

Chinese Office Action dated Dec. 22, 2015 in connection with the counterpart Chinese Patent Application No. 201410184007.3.
Korean Office Action for KR application No. 10-2013-0028613, issued on Apr. 14, 2014.

*Primary Examiner* — Edward Tso
(74) *Attorney, Agent, or Firm* — Hauptman Ham, LLP

(57) ABSTRACT

Provided is a forced discharge circuit of a battery charger for an electric vehicle, which is capable of forcibly discharging a high voltage in accordance with the electric safety code for electric vehicles when the function of the battery charger is stopped. A forced discharge circuit of a battery charger for an electric vehicle, which discharges a high voltage applied to the battery charger that converters commercial power to charge a vehicle battery, includes: a micro control unit (MCU) configured to generate a control signal according to a charge state of the battery charger; a discharge resistor connected in parallel to the battery charger; and a relay connected in series to the discharge resistor and configured to operate in an on or off state according to the control signal of the MCU.

18 Claims, 13 Drawing Sheets

(51) Int. Cl.
  *B60L 11/18*    (2006.01)
  *H02M 3/337*    (2006.01)
  *H02M 1/00*     (2006.01)

(52) U.S. Cl.
  CPC . *H02M2001/007* (2013.01); *H02M 2001/0058* (2013.01); *Y02T 10/7005* (2013.01); *Y02T 10/7072* (2013.01); *Y02T 10/92* (2013.01); *Y02T 90/127* (2013.01); *Y02T 90/14* (2013.01)

(56) References Cited

FOREIGN PATENT DOCUMENTS

| JP | 2011205755 A | 10/2011 |
| JP | 2013009486 A | 1/2013 |
| KR | 1020120007663 A | 1/2012 |

* cited by examiner

FORCED DISCHARGE CIRCUIT OF
BATTERY CHARGER FOR ELECTRIC
VEHICLE, BATTERY CHARGER FOR
ELECTRIC VEHICLE, AND ELECTRIC
VEHICLE HAVING FUNCTION OF THE
BATTERY CHARGE

CROSS-REFERENCE(S) TO RELATED
APPLICATION

This application claims the benefit of Korean Patent Application No. 10-2013-0028613, filed on Mar. 18, 2013, in the Korean Intellectual Property Office, the contents of which are incorporated herein by reference in its entirety.

BACKGROUND OF THE INVENTION

1. Field of the Invention

The present invention relates to a battery charger for an electric vehicle, and more particularly, to a forced discharge circuit of a battery charger for an electric vehicle, which is capable of forcibly discharging a high voltage in accordance with the electric safety code for electric vehicles when the function of the battery charger is stopped, a battery charger for an electric vehicle including the forced discharge circuit, and an electric vehicle having a function of the battery charger.

2. Description of the Related Art

Recently, as the problem of environmental pollution on the earth has become serious, the use of pollution-free energy has become more and more important. In particular, the problem of air pollution in big cities is becoming more serious, and exhaust gas of vehicles is one of main causes thereof.

In such a state, research has been actively conducted on so-called electric vehicles which use pollution-free energy, for example, electricity as power source. The electric vehicle receives electric energy from outside, charges the received electric energy in a battery, and then obtains mechanical energy through a motor coupled to wheels by using the voltage charged in the battery.

That is, since the electric vehicle drives the motor using the voltage charged in the battery, the electric vehicle uses a large-capacity rechargeable battery and includes a battery charger for charging the large-capacity rechargeable battery.

The battery charger may be divided into a quick battery charger and a slow battery charger, depending on a charging time. Furthermore, the battery charger may be divided into an onboard type battery charger and a mounting type battery charger, depending on whether the battery charger is built in a vehicle. The quick battery charger is installed in a place for quickly charging a battery during operation, such as a gas station, and the charging time thereof requires about 20 minutes. On the other hand, the slow battery charger is installed in a place, such as a parking lot or shopping mall, where the electric vehicle is expected to be parked for a long time, and the charging time thereof requires about five hours.

Recently, as the development and distribution of electric vehicles (EV) and plug-in hybrid electric vehicles (PHEV) have been accelerated, the international standards (SAEJ 1772, IEC 61851-1 and the like) and the domestic standards (K 61851-1 and the like) related to a battery charger for EV/PHEV have been announced.

After input power is removed from a battery charger in operation, the internal voltage of an onboard battery charger (OBC) may be charged to a high voltage of, for example, DC 400V, which may cause electric shock.

In accordance with the electric safety code (UL 2202) for electric vehicles, a high voltage of a circuit within the OBC must be dropped to 60V or less within five seconds when the function of the OBC is stopped.

Therefore, there is a demand for a method that can forcibly drop a voltage within a predetermined time in accordance with the electric safety code for electric vehicles when the input power is removed from the OBC in operation.

SUMMARY OF THE INVENTION

Therefore, the present invention has been made in an effort to solve the above problems and is directed to a forced discharge circuit of a battery charger for an electric vehicle, which is capable of forcibly dropping a voltage within a predetermined time in accordance with the electric safety code of the electric vehicle when input power is removed from an OBC in operation, a battery charger for an electric vehicle including the forced discharge circuit, and an electric vehicle having the function of the battery charger.

Also, the present invention is directed to a forced discharge circuit of a battery charger for an electric vehicle, in which a relay operates in an initial state (i.e., a close state) when input power is removed, and therefore can forcibly discharge a high voltage of the battery charger, a battery charger for an electric vehicle including the circuit, and an electric vehicle having a function of the battery charger.

The characteristic configurations of the present invention for achieving the above objects and unique effects of the present invention are as follows.

According to an aspect of the present invention, there is provided a forced discharge circuit of a battery charger for an electric vehicle, which discharges a high voltage applied to the battery charger that converters commercial power to charge a vehicle battery, the force discharge circuit including: a micro control unit (MCU) configured to generate a control signal according to a charge state of the battery charger; a discharge resistor connected in parallel to the battery charger; and a relay connected in series to the discharge resistor and configured to operate in an on or off state according to the control signal of the MCU.

The relay may be a normal close (NC) type relay configured to maintain an open state when a voltage is applied and maintain a close state when no voltage is applied.

The forced discharge circuit may further include an insulation control device provided between the MCU and the relay to control a current flow according to the control signal of the MCU.

The MCU may output a LOW signal to the insulation control device when the function of the battery charger is stopped.

The insulation control device may be a photo coupler.
The insulation control device may be a pulse transformer.

The forced discharge circuit may further include a field effect transistor (FET) provided between the insulation control device and the relay to control a current flowing into the relay according to the current flow of the insulation control device.

According to another aspect of the present invention, there is provided a battery charger for an electric vehicle including: an AC power supply configured to supply commercial power; a filter/rectifier configured to rectify the commercial power supplied from the AC power supply into a DC voltage; a converter configured to convert the DC voltage output from the filter/rectifier into a voltage that is chargeable to a battery; and a discharge circuit connected in parallel to the converter and configured to forcibly discharge a high voltage applied to the converter when input power is removed from the AC power supply.

The discharge circuit may include: an MCU configured to generate a control signal according to a charge state of the battery charger; a discharge resistor connected in parallel to the battery charger; and a relay connected in series to the discharge resistor and configured to operate in an on or off state according to the control signal of the MCU.

The relay may be configured to maintain an open state when a voltage is applied and maintain a close state when no voltage is applied.

The discharge circuit may further include an insulation control device provided between the MCU and the relay to control a current flow according to the control signal of the MCU.

The MCU may output a LOW signal to the insulation control device when the function of the battery charger is stopped.

The insulation control device may be a photo coupler.

The insulation control device may be a pulse transformer.

The discharge circuit may further include a field effect transistor (FET) provided between the insulation control device and the relay to control a current flowing into the relay according to the current flow of the insulation control device.

The converter may include: a power factor correction circuit having a power factor correction function and configured to convert commercial power; an LLC converter configured to switch a current supplied from the power factor correction circuit through LLC to convert the current into a pulse signal; and a buck converter configured to convert the current output from the LLC converter into a voltage that is chargeable to a battery.

The discharge circuit may be connected in parallel between the filter/rectifier and the power factor correction circuit.

The discharge circuit may be connected in parallel between the power factor correction circuit and the LLC converter.

The discharge charger may be connected in parallel between the LLC converter and the buck converter.

The discharge charger may be connected in parallel between the buck converter and the battery.

According to another aspect of the present invention, in a control system of a battery charger for an electric vehicle, which controls a charging operation of the battery charger that is supplied with power from an electric vehicle supply equipment and charges a vehicle driving battery built in the electric vehicle, an electric vehicle including an onboard battery charger and having a charging function, the electric vehicle includes: an onboard battery charger built in the electric vehicle and configured to be supplied with power from the electric vehicle supply equipment to charge the battery; and the battery configured to be supplied with power from the onboard battery charger and be charged, wherein the onboard battery charger includes: an AC power supply configured to supply commercial power; a filter/rectifier configured to rectify the commercial power supplied from the AC power into a DC voltage; a converter configured to convert the DC voltage output from the filter/rectifier into a voltage that is chargeable to a battery; and a discharge circuit connected in parallel to the converter and configured to forcibly discharge a high voltage applied to the converter when input power is removed from the AC power supply.

DETAILED DESCRIPTION OF EXEMPLARY EMBODIMENTS

Figure 1:
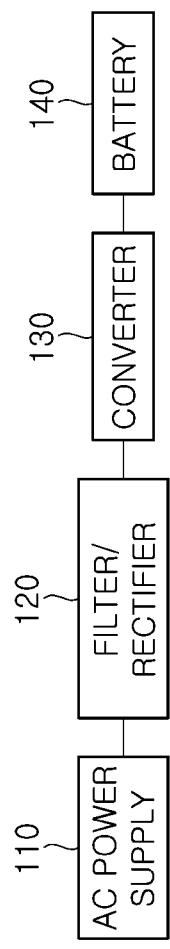
FIG. 1 is a block diagram illustrating a circuit configuration of a general battery charger.

Exemplary embodiments of the present invention will be described below in detail with reference to the accompanying drawings. These embodiments are provided so that this disclosure will be thorough and complete, and will fully convey the scope of the invention to those skilled in the art. It should be understood that various embodiments of the present invention are different from one another, but are not necessarily exclusive. For example, the particular shape, structure and feature described herein can be embodied in other embodiments, without departing from the spirit and scope of the present invention. Also, it should be understood that the positions or arrangement of individual elements set forth in the respective embodiments can be changed without departing from the spirit and scope of the present invention. Therefore, the following description is not intended to be construed as the restrictive meaning. If appropriately described, the scope of the present invention is defined by the appended claims and equivalents thereof. Throughout the drawings, like reference numerals will be used to refer to like or similar elements.

The present invention discloses a forced discharge circuit of a battery charger for an electric vehicle, which is capable of forcibly discharging a high voltage in accordance with the electric safety code for electric vehicles when the function of the battery charger is stopped, and a battery charger for an electric vehicle including the forced discharge circuit.

According to embodiments of the present invention, a discharge circuit may be additionally provided, which is capable of instantaneously discharging a high voltage to a converter provided between a filter/rectifier and a battery in the circuit configuration of the battery charger.

In addition, the discharge circuit may be implemented with a normal connect (N.C) type relay according to an embodiment of the present invention. Therefore, when input power is removed from an OBC or an abnormality occurs in a micro control unit (MCU), the relay may operate in an initial state, that is, a close state, thereby forcibly discharging a high voltage of the battery charger.

Hereinafter, embodiments of the present invention will be described in detail with reference to the accompanying drawings such that the present invention can easily be carried out by those skilled in the art to which the present invention pertains.

FIG. 1 is a block diagram illustrating a circuit configuration of a general battery charger. Referring to FIG. 1, the battery charger (for example, OBC for PSEV) may include an AC power supply 110, a filter/rectifier 120, a converter 130, a battery 140, and the like. The battery charger converts commercial power of AC 220V supplied from the AC power supply 110 and charges the battery 140 with the converted power.

More specifically, the filter/rectifier 120 rectifies the AC power supplied from the AC power supply 110 into a DC voltage (for example, DC 400 V), and the converter 130 converts the DC voltage into a DC voltage (for example, DC 270V to DC 413V), which can be charged in the battery 140, and charges the battery 140 with the converted DC voltage.

Figure 2:
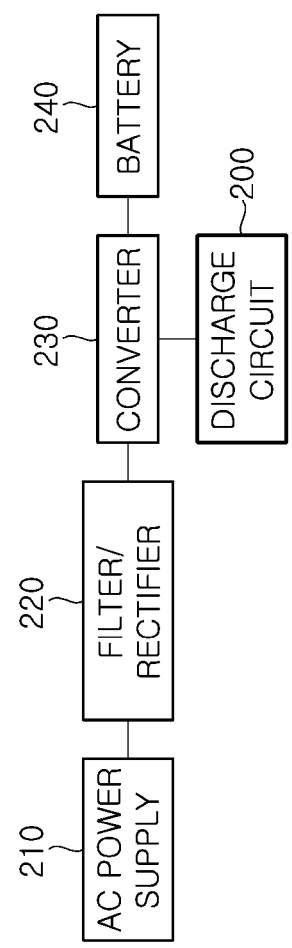
FIG. 2 is a block diagram illustrating a battery charger to which a discharge circuit according to the present invention is added.

In the present embodiment, as illustrated in FIG. 2, a discharge circuit 200 may be added to the converter 230 to which a high voltage is applied during a charging operation. Therefore, after input power is removed from the AC power supply 210, the high voltage applied to the converter 230 is forcibly discharged through the discharge circuit 200. FIG. 2 is a block diagram illustrating a battery charger to which the discharge circuit according to the present invention is added. A detailed configuration of the discharge circuit will be described below with reference to FIG. 14.

On the other hand, the discharge circuit 200 may be connected in parallel to each part of the converter 230 as in embodiments of FIGS. 3 to 6. Hereafter, the additional configuration of the discharge circuit 200 according to the embodiments of FIGS. 3 to 6 will be described in detail with reference to FIGS. 7 to 10.

Figure 3:
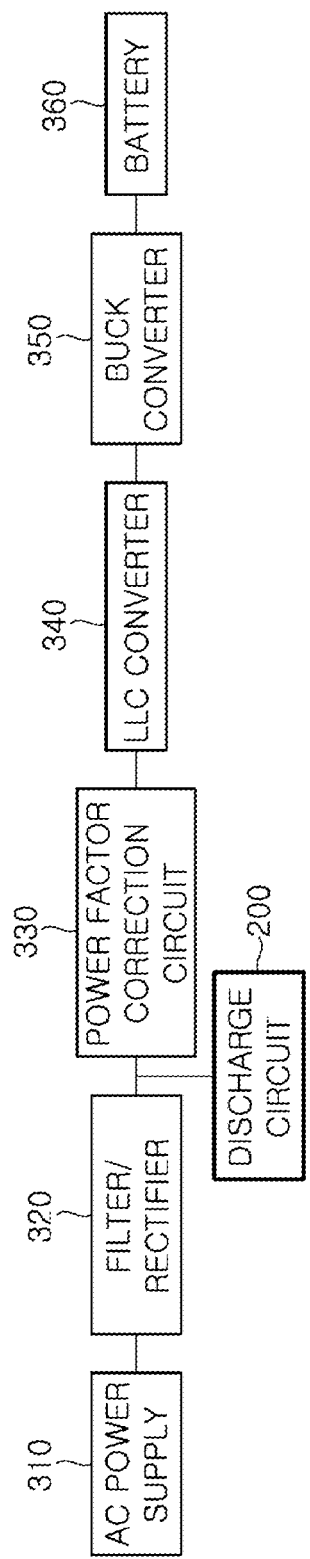
FIG. 3 is a block diagram illustrating a battery charger to which a discharge circuit according to a first embodiment of the present invention is added.

FIG. 3 is a block diagram illustrating a battery charger to which a discharge circuit according to a first embodiment of the present invention is added. Referring to FIG. 3, the battery charger according to the embodiment of the present invention may include an AC power supply 310, a filter/rectifier 320, a power factor correction circuit 330, a line level control (LLC) converter 340, a buck converter 350, and a battery 360. The power factor correction circuit 330 has a function of correcting a power factor, and converts commercial power of AC 220V into 400V. The LLC converter 340 switches a current supplied from the power factor correction circuit 330 by LLC, and converts the current into a pulse signal of 100 kHz. The buck converter 350 converters the current converted through the LLC converter 340 into a voltage of DC 270V to DC 413V, and charges the battery 360.

In this case, the discharge circuit 200 according to the embodiment of the present invention may be connected in parallel between the filter/rectifier 320 and the power factor correction circuit 330.

Figure 7:
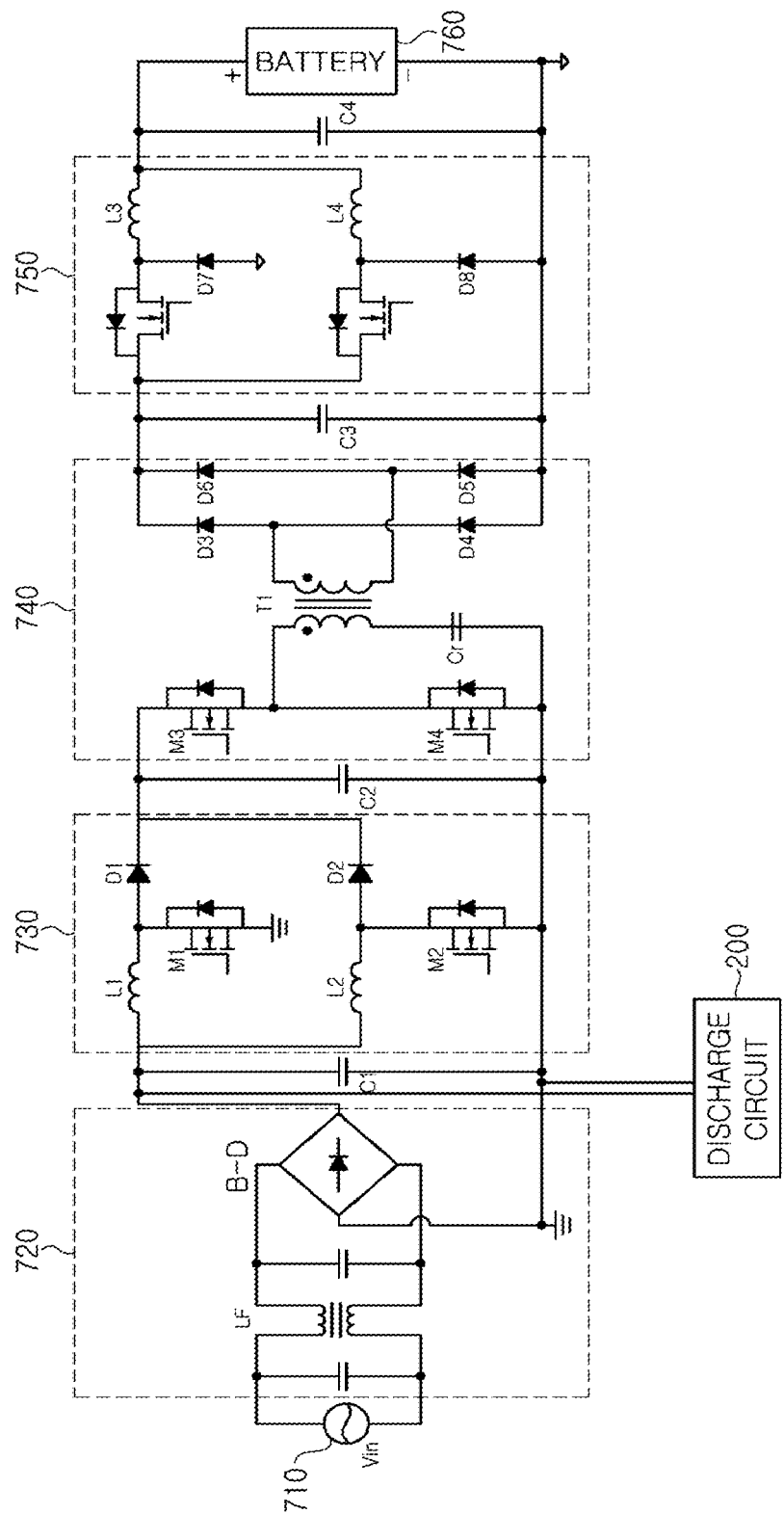
FIG. 7 is a circuit diagram of the battery charger to which the discharge circuit according to the first embodiment of the present invention is added.

FIG. 7 is a circuit diagram of the battery charger to which the discharge circuit 200 according to the first embodiment of the present invention is added. Referring to FIG. 7, a PSEV OBC is a power converter which converts AC 220V (commercial power) and charges an electric vehicle (EV) battery. The circuit of the power converter may be implemented in a circuit that boosts AC 220V to DC 400V, transforms the boosted voltage of DC 400V from a primary side to a secondary side in a transformer, and charges the EV battery.

In FIG. 7, reference numeral 720 corresponds to the filter/rectifier 320 of FIG. 3, reference numeral 730 corresponds to the power factor correction circuit 330, reference numeral 740 corresponds to the LLC converter 340, and reference numeral 750 corresponds to the buck converter 350.

That is, as illustrated in FIG. 7, the discharge circuit 200 according to the first embodiment of the present invention may be connected in parallel between the filter/rectifier 720 and the power factor correction circuit 730. Therefore, when input power of the AC power supply 720 is removed, the relay of the discharge circuit 200 operates in the initial state, that is, the close state. Therefore, a high voltage charged in a capacitor C1 of the power circuit corrector 330 is instantaneously discharged to the discharge circuit 200.

Figure 4:
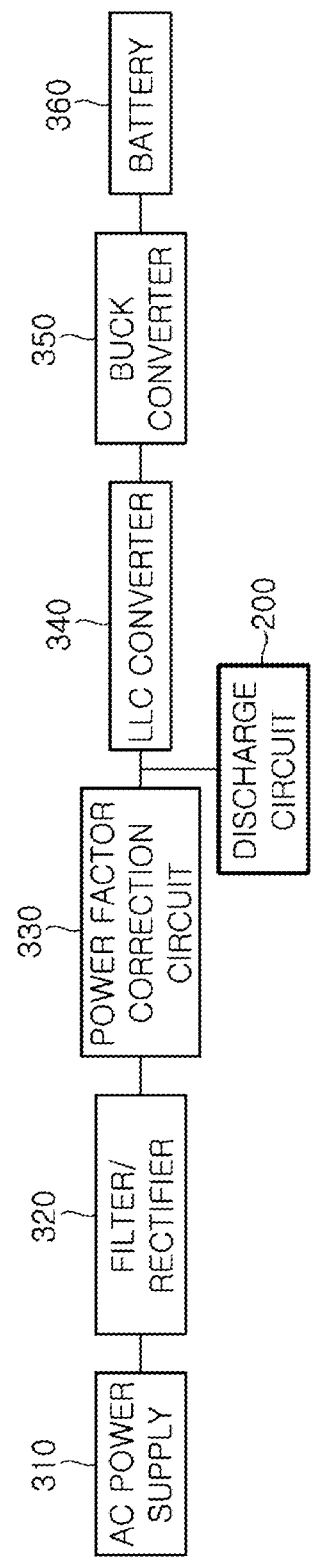
FIG. 4 is a block diagram illustrating a battery charger to which a discharge circuit according to a second embodiment of the present invention is added.

FIG. 4 is a block diagram illustrating a battery charger to which a discharge circuit according to a second embodiment of the present invention is added. Referring to FIG. 4, the discharge circuit 200 according to the second embodiment of the present invention may be connected in parallel between the power factor correction circuit 330 and the LLC converter 340.

Figure 8:
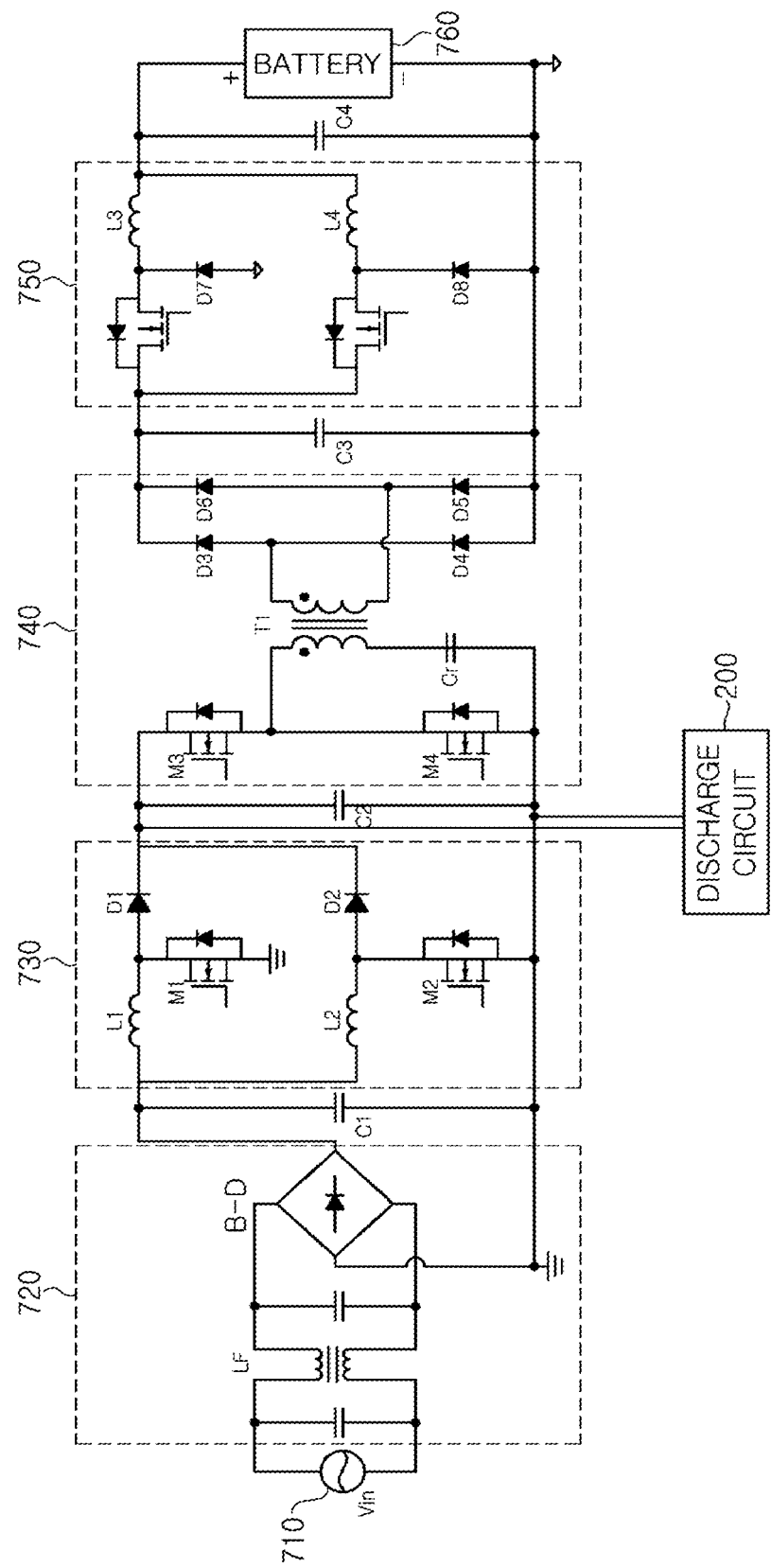
FIG. 8 is a circuit diagram of the battery charger to which the discharge circuit according to the second embodiment of the present invention is added.

FIG. 8 is a circuit diagram of the battery charger to which the discharge circuit 200 according to the second embodiment of the present invention is added. That is, the discharge circuit 200 according to the second embodiment of the present invention may be connected in parallel between the power factor circuit 730 and the LLC converter 740. When input power of the AC power supply 720 is removed, the relay of the discharge circuit 200 operates in the initial state, that is, the close state. Therefore, a high voltage charged in a capacitor C2 of the power factor correction circuit 330 is instantaneously discharged to the discharge circuit 200.

Figure 5:
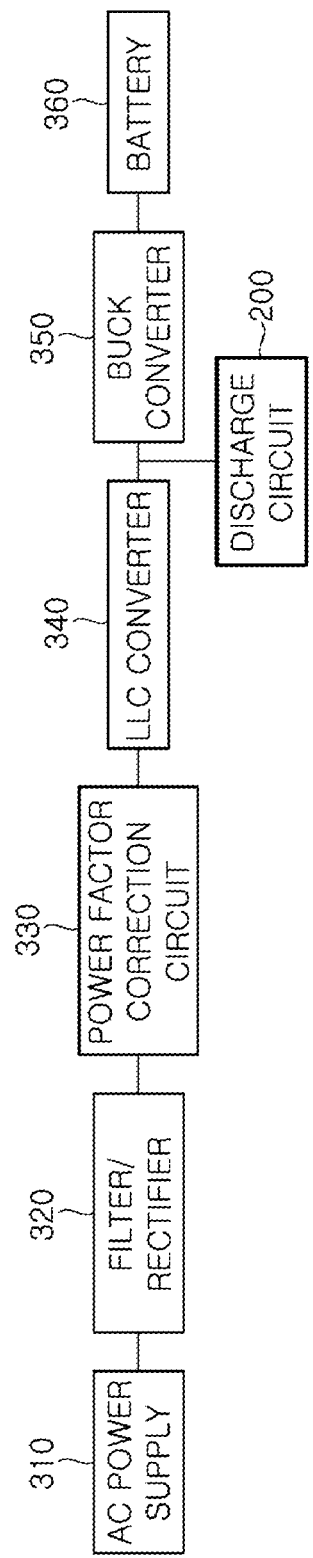
FIG. 5 is a block diagram illustrating a battery charger to which a discharge circuit according to a third embodiment of the present invention is added.

FIG. 5 is a block diagram illustrating a battery charger to which a discharge circuit according to a third embodiment of the present invention is added. Referring to FIG. 5, the discharge circuit 200 according to the third embodiment of the present invention may be connected in parallel between the LLC converter 340 and the buck converter 350.

Figure 9:
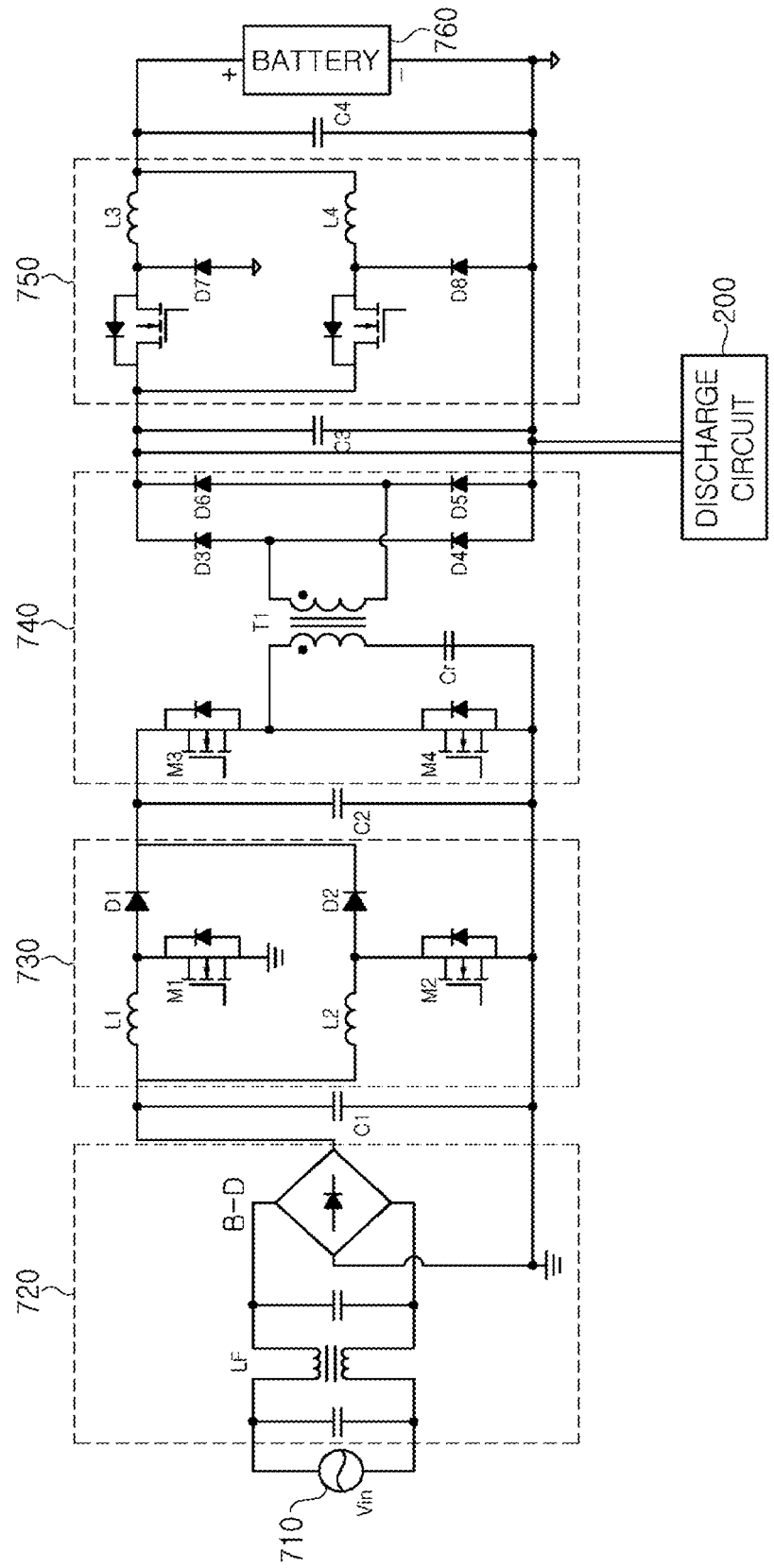
FIG. 9 is a circuit diagram of the battery charger to which the discharge circuit according to the third embodiment of the present invention is added.

FIG. 9 is a circuit diagram of the battery charger to which the discharge circuit 200 according to the third embodiment of the present invention is added. That is, as illustrated in FIG. 9, the discharge circuit 200 according to the third embodiment of the present invention may be connected in parallel between the LLC converter 740 and the buck converter 750. Therefore, when input power of the AC power supply 720 is removed, the relay of the discharge circuit 200 operates in the initial state, that is, the close state. Therefore, a high voltage charged in a capacitor C3 is instantaneously discharged to the discharge circuit 200.

Figure 6:
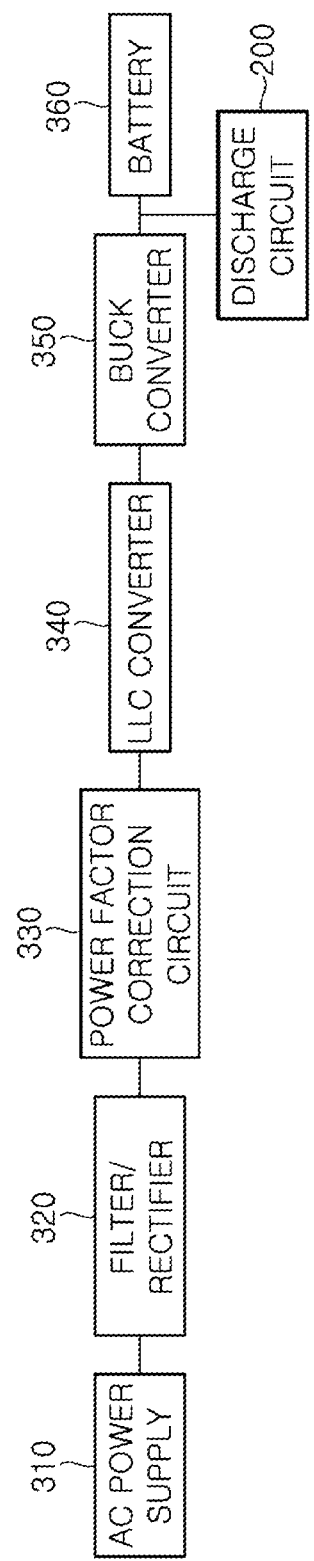
FIG. 6 is a block diagram illustrating a battery charger to which a discharge circuit according to a fourth embodiment of the present invention is added.

FIG. 6 is a block diagram illustrating a battery charger to which a discharge circuit according to a fourth embodiment of the present invention is added. Referring to FIG. 6, the discharge circuit 200 according to the fourth embodiment of the present invention may be connected in parallel between the buck converter 350 and the battery.

Figure 10:
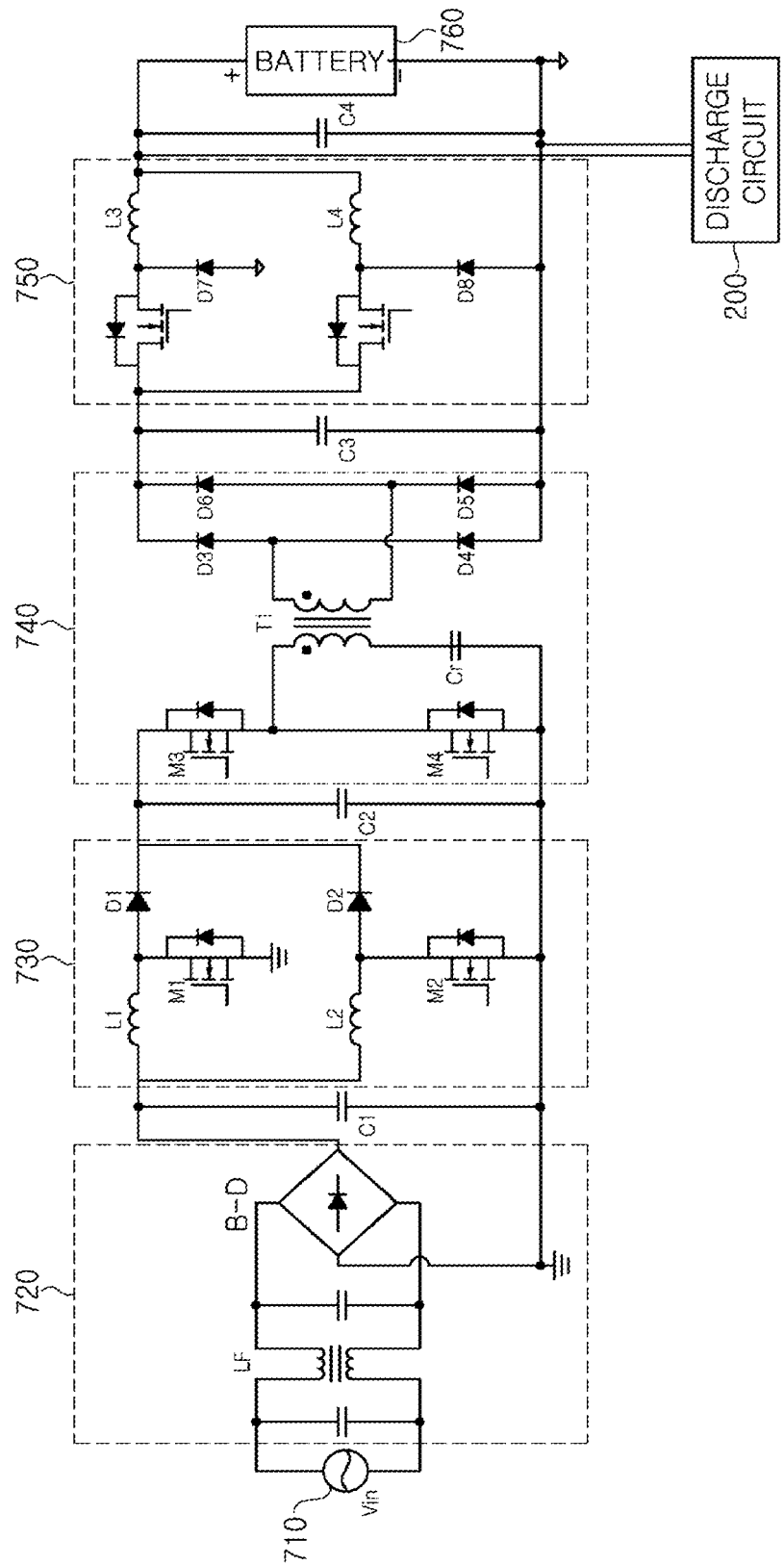
FIG. 10 is a circuit diagram of the battery charger to which the discharge circuit according to the fourth embodiment of the present invention is added.

FIG. 10 is a circuit diagram of the battery charger to which the discharge circuit 200 according to the fourth embodiment of the present invention is added. That is, as illustrated in FIG. 10, the discharge circuit 200 according to the fourth embodiment of the present invention may be connected in parallel between the buck converter 750 and the battery 760. Therefore, when input power of the AC power supply 720 is removed, the relay of the discharge circuit 200 operates in the initial state, that is, the close state. Therefore, a high voltage charged in a capacitor C4 is instantaneously discharged to the discharge circuit 200.

On the other hand, the discharge circuit 200 according to the embodiment of the present invention can be equally applied to battery chargers configuring other types of circuits.

Figure 11:
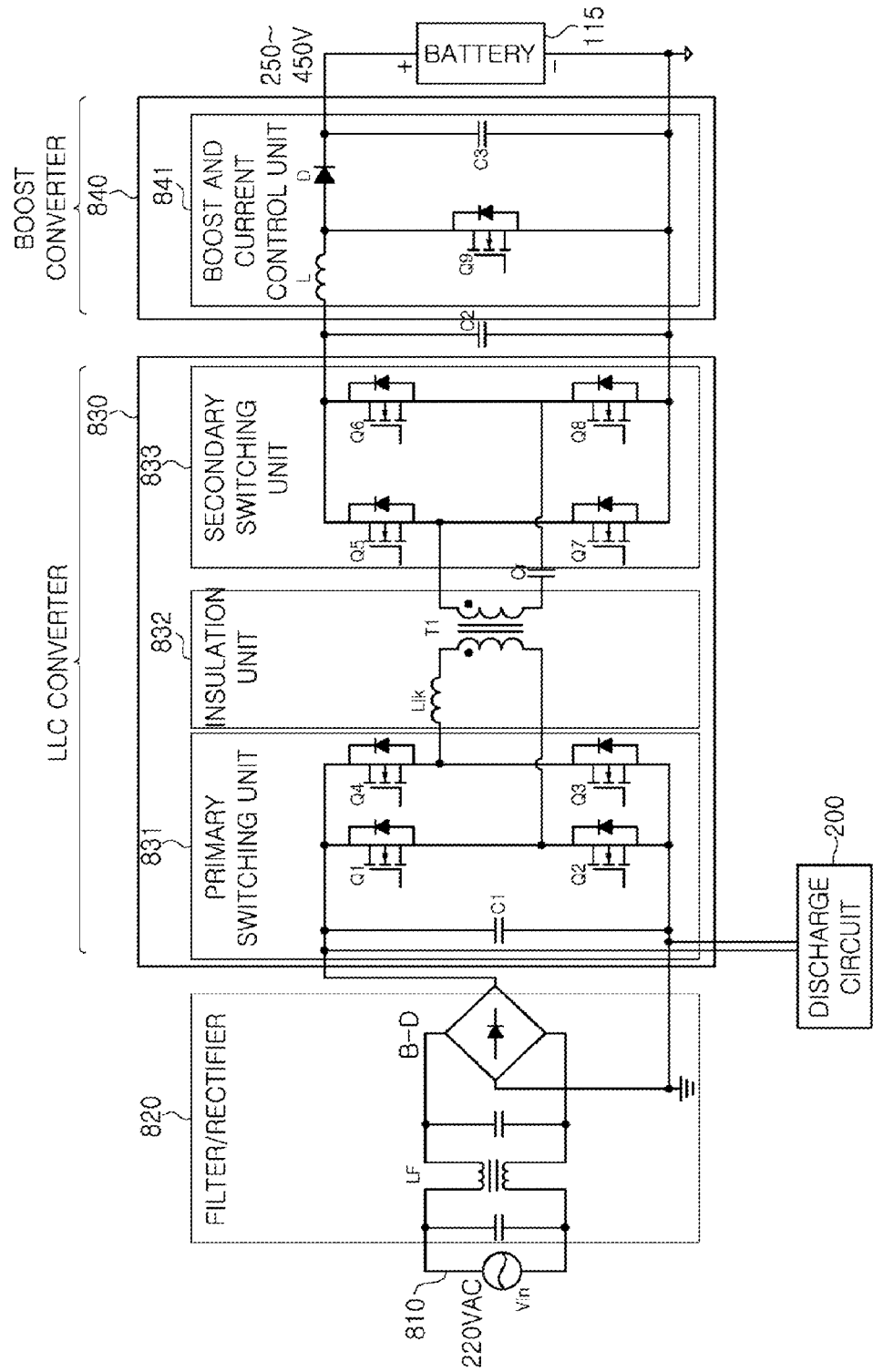
FIG. 11 is a circuit diagram of a battery charger to which a discharge circuit according to a fifth embodiment of the present invention is added.

FIG. 11 is a circuit diagram of a battery charger to which a discharge circuit according to a fifth embodiment of the present invention is added. Referring to FIG. 11, the battery charger provided in an onboard charging device may include a filter/rectifier 820, an LLC converter 830, and a boost converter 840. Furthermore, the LLC converter 830 may include a primary switching unit 831, an insulation unit 832, a secondary switching unit 833 and a boost and current control unit 841.

The filter/rectifier 820 filters and rectifies an input 220V AC current 810, and output a current of 240V 120 Hz as illustrated in FIG. 11. The primary switching unit 831 switches the current supplied from the filter/rectifier 820 through LLC, and converts the current into a pulse signal of 100 kHz. The insulation unit 832 transmits power to the secondary switching unit 833 through a transformer, and the secondary switching unit 833 generates an 80V DC link current. Finally, the boost and current control unit 841 boosts the DC link current and outputs the boosted current as a current of 50 kHz to charge the battery 115.

The detailed method for implementing the battery charger to which the present invention is applied can be realized in various manners, and the present invention is not limited to the circuit illustrated in FIG. 11.

FIG. 11 is a block diagram illustrating the battery charger to which the discharge circuit according to the fifth embodiment of the present invention is added. Referring to FIG. 11, the discharge circuit 200 according to the fifth embodiment of the present invention may be connected in parallel between the filter/rectifier 820 and the LLC converter 830. Therefore, when AC input power is removed, the relay of the discharge circuit 200 may operate in the initial state, that is, the close state. Therefore, a high voltage charged in the capacitor C1 is instantaneously discharged to the discharge circuit 200.

Figure 12:
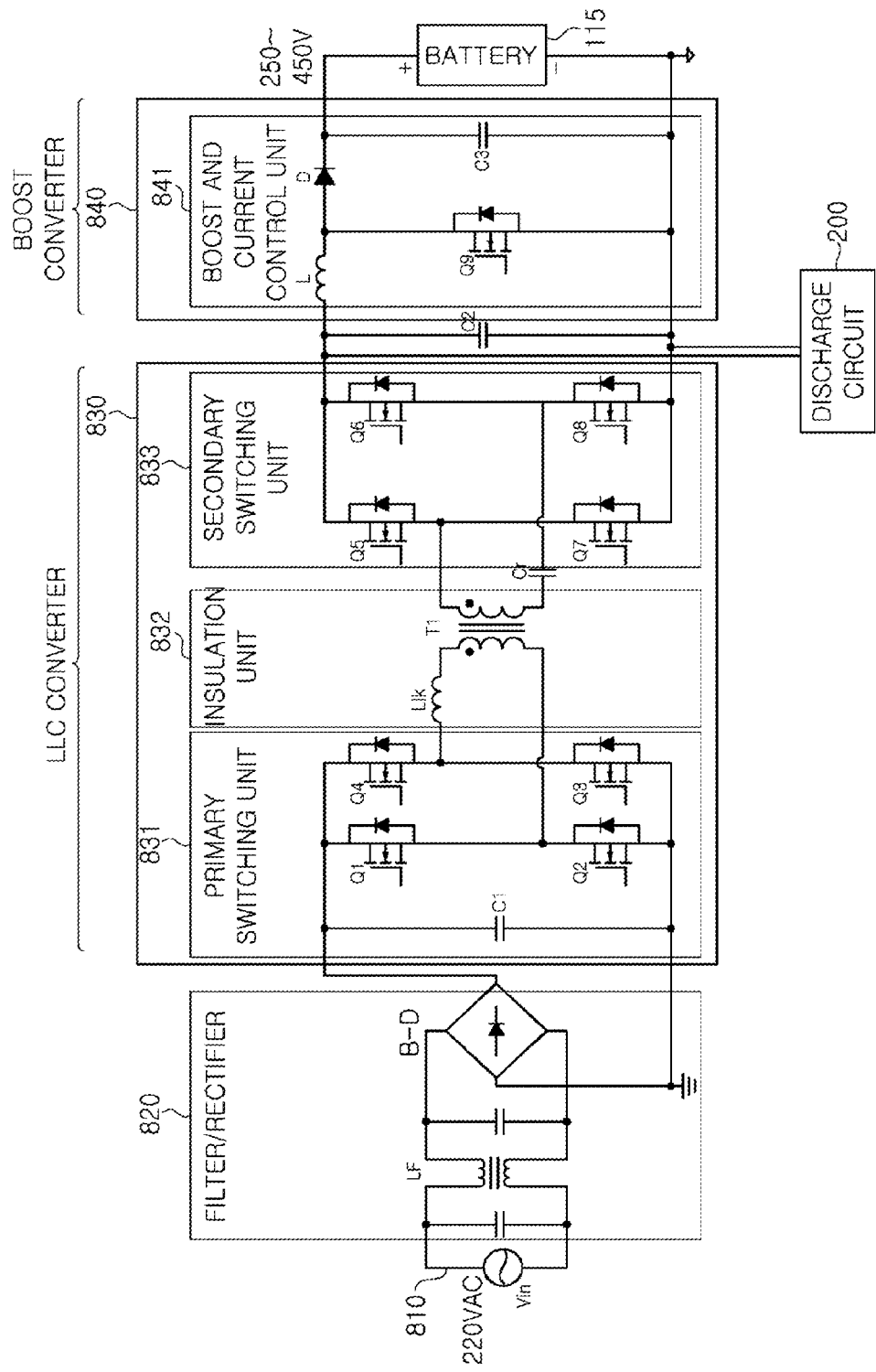
FIG. 12 is a circuit diagram of a battery charger to which a discharge circuit according to a sixth embodiment of the present invention is added.

FIG. 12 is a circuit diagram of a battery charger to which a discharge circuit according to a sixth embodiment of the present invention is added. Referring to FIG. 12, the discharge circuit 200 according to the sixth embodiment of the present invention may be connected in parallel between the LLC converter 830 and the boost converter 840. Therefore, when AC input power is removed, the relay of the discharge circuit 200 may operate in the initial state, that is, the close state. Therefore, a high voltage charged in a capacitor C2 is instantaneously discharged to the discharge circuit 200.

Figure 13:
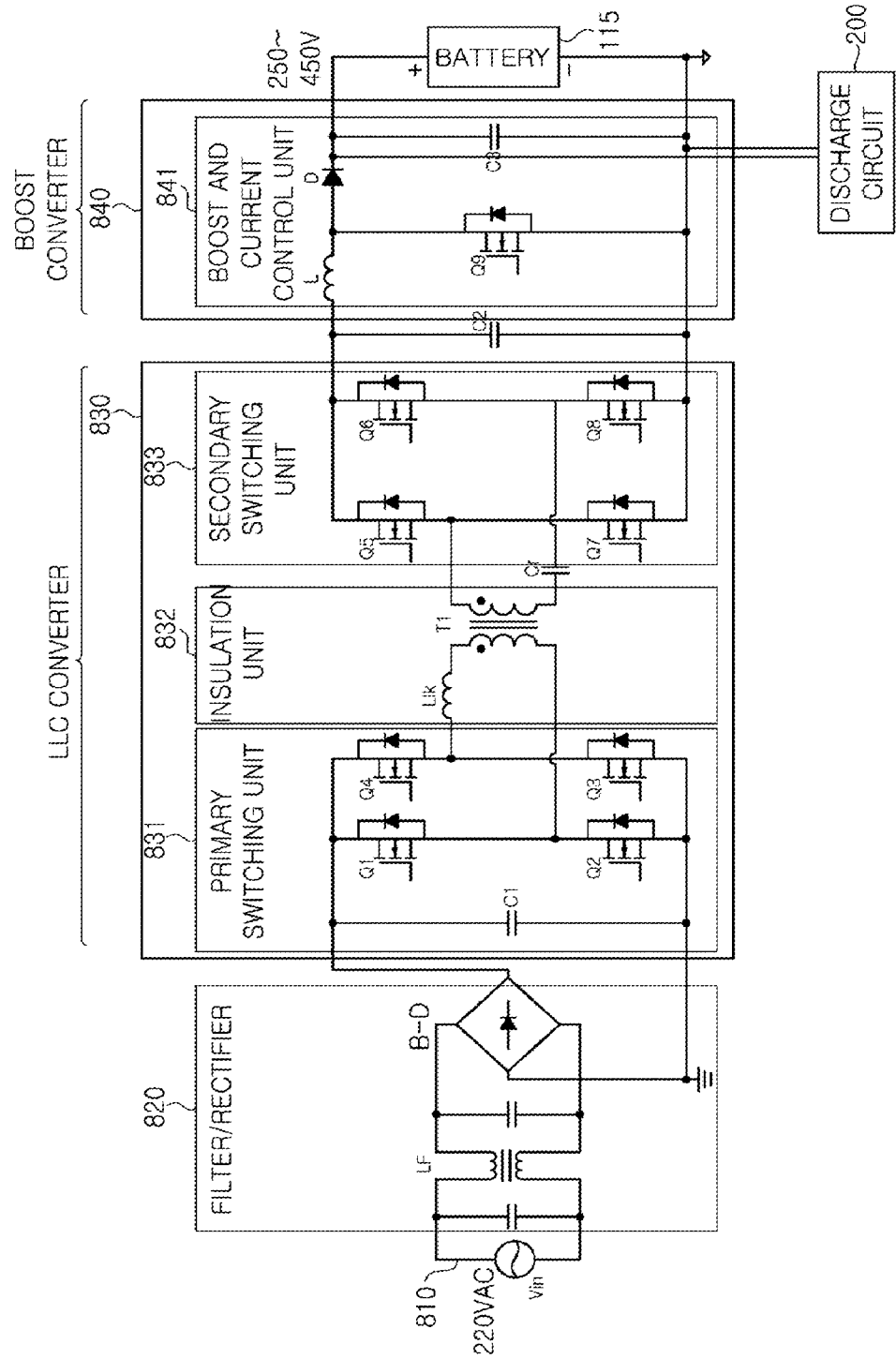
FIG. 13 is a circuit diagram of a battery charger to which a discharge circuit according to a seventh embodiment of the present invention is added.

FIG. 13 is a circuit diagram of a battery charger to which a discharge circuit according to a seventh embodiment of the present invention is added. Referring to FIG. 13, the discharge circuit 200 according to the seventh embodiment of the present invention may be connected in parallel between the boost converter 840 and the battery 115. Therefore, when AC input power is removed, the relay of the discharge circuit 200 may operate in the initial state, that is, the close state. Therefore, a high voltage charged in a capacitor C3 is instantaneously discharged to the discharge circuit 200.

Among the circuit components of the battery charger according to the above-described embodiments, the converter 230 may corresponds to a section which is not discharged. At this time, when a high voltage applied to the converter 230 is intended to be discharged to a discharge resistor, the capacity of the resistor must be considerably increased. In this case, the efficiency of the battery charger inevitably decreases. Furthermore, even when a battery charger circuit is implemented in a package type, a problem may occur due to a discharge resistor. Therefore, as described above, the separate discharge circuit 200 may be connected in parallel to the converter 230, in order to solve the above-described problem.

Figure 14:
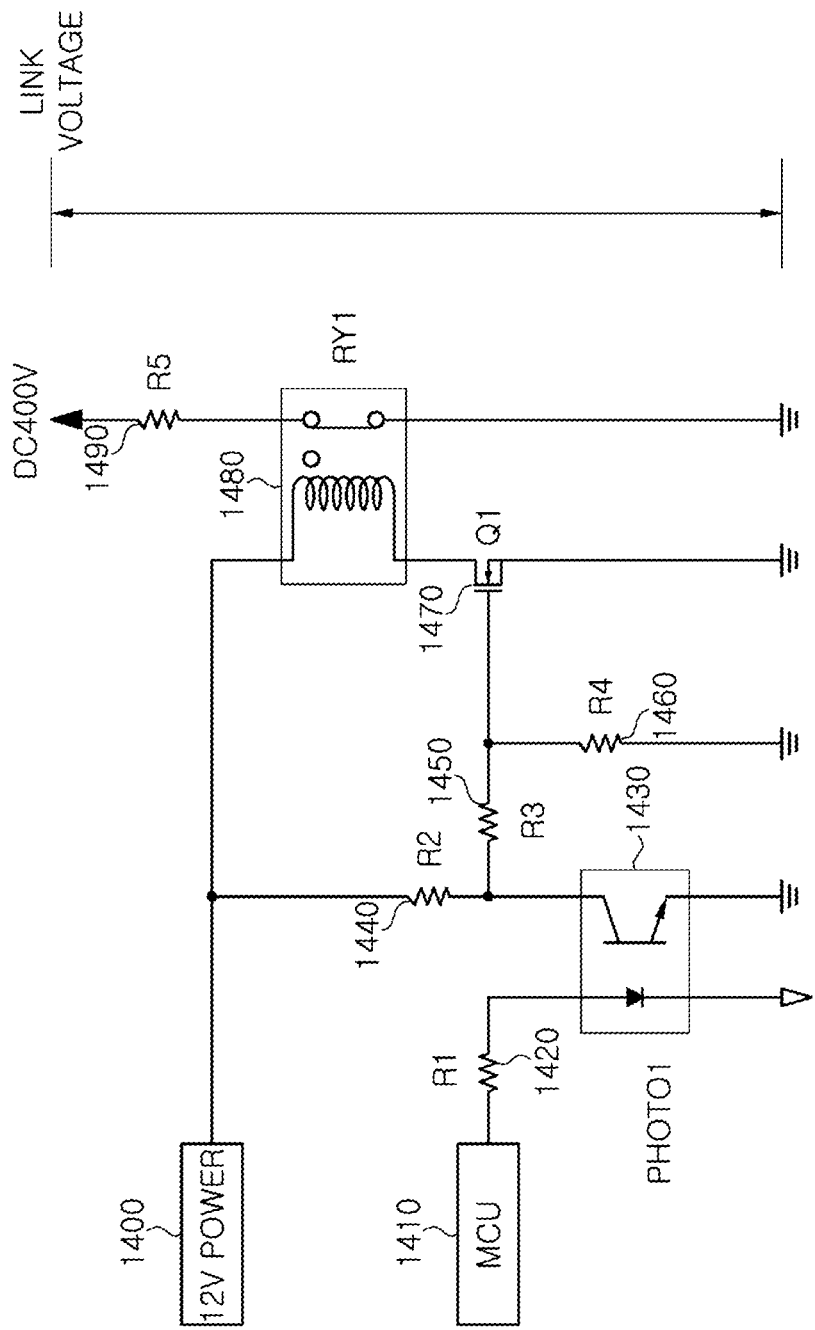
FIG. 14 is a circuit diagram illustrating the detailed configuration of the discharge circuit according to the embodiment of the present invention.

FIG. 14 is a circuit diagram illustrating the detailed configuration of the discharge circuit according to the embodiment of the present invention. Referring to FIG. 14, the discharge circuit 200 according to the embodiment of the present invention is connected in parallel within the converter of the above-described battery charger. That is, the discharge circuit 200 is connected in parallel to DC 400V as a link voltage.

The detailed operation of the discharge circuit 200 is as follows.

DC 400V represents the voltage of the converter (for example, PFC), and the relay (RY1) 1480 is an N.C type which maintains the close state when no power is applied.

When the AC power supply 210 applies power to normally operate the OBC, an MCU 1410 outputs a LOW signal to a resistor R1, and no current may flow through a phototransistor of a photo coupler 1430. Therefore, a HIGH signal is applied to an FET (Q1) 1470. The HIGH signal operates the FET 1470. Then, the relay (RY1) 1480 is driven to operate in an N.C (Normal Open) state, thereby enabling the normal operation of the OBC. That is, the discharge circuit 200 connected in parallel to the converter of the battery charger becomes an open state such that no current flows through the discharge circuit 200. Consequently, a normal charging operation will be performed.

On the other hand, when the AC power is turned off, 12V power 1400 is turned off, and the output signal of the MCU is removed. Therefore, the relay (RY1) 1480 becomes the initial state, that is, an N.C (Normal Close) state such that the switch is closed. Therefore, a high voltage of DC 400V applied to the converter is applied to the discharge circuit 200 and is discharged through a resistor (R5) 1490. At this time, the discharge time is determined according to a time constant of the resistor (R5) 1490, and it is preferable that the value of the resistor R5 is set to 60V or less which is not harmful to the human body.

As illustrated in FIG. 14, the discharge circuit 200 includes the photo coupler 1430 provided between the MCU 1410 and the FET 1470. The photo coupler 1430 operates the relay 1480 by controlling on/off of the FET 1470 according to the output signal of the MCU 1410. At this time, other control elements may replace the photo coupler 1430, depending on embodiments. However, since the ground level of the MCU 1410 is different from the ground level of the 12V power, it is preferable to use an insulation control element (for example, a pulse transformer or the like).

According to the embodiments of the present invention, when input power of the OBC in operation is removed, a high voltage applied to the battery charger is instantaneously discharged to forcibly drop a voltage within a predetermined time, thereby satisfying the electric safety code (UL2202) for electric vehicles.

Furthermore, by configuring the discharge circuit with the N.C (Normal Connect) type relay, a high voltage of the battery charger can be forcibly discharged in a hardware manner even when an abnormally occurs in the MCU.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries and sequences are thus within the scope and spirit of the claimed invention. In addition, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While particular combinations of various functions and features of the present invention have been expressly described herein, other combinations of these features and functions are likewise possible. The present invention is not limited by the particular examples disclosed herein and expressly incorporates these other combinations.

Although the present invention has been described above with reference to specific features, such as concrete components, limited embodiments, and drawings, this is solely for the purpose of aiding general understanding of the present invention; the present invention is not limited to the above embodiments, and those skilled in the art can make various changes and modifications from the disclosure.

Therefore, the idea of the present invention is not to be limited to the described embodiments, and not only the following claims but any equivalent or equivalent change thereof fall within the scope of the present invention.

| Description of Reference Numerals | |
|---|---|
| 110, 210: AC power supply | 120, 220: filter/rectifier |
| 130, 230: converter | 140, 240: battery |
| 200: discharge circuit | 310, 810: AC power supply |
| 320, 820: filter/rectifier | 330: power factor correction circuit |
| 340, 830: LLC converter | 350: buck converter |
| 831: primary switching unit | 832: insulation unit |
| 833: secondary switching unit | 841: boost and current control unit |
| 1400: 12 V power | 1410: MCU |
| 1420, 1440, 1450, 1460, 1490: resister | |
| 1430: photo coupler | 1470: FET |
| 1480: relay | |

What is claimed is:

1. A forced discharge circuit of a battery charger for an electric vehicle, which discharges a high voltage applied to the battery charger that converters commercial power to charge a vehicle battery, the forced discharge circuit comprising:
a micro control unit (MCU) configured to generate a control signal according to a charge state of the battery charger;
a discharge resistor connected in parallel to the battery charger;
a relay connected in series to the discharge resistor and configured to operate in an on or off state according to the control signal of the MCU; and
an insulation control device provided between the MCU and the relay to control a current flow according to the control signal of the MCU.

2. The forced discharge circuit according to claim 1, wherein the relay is a normal close (NC) type relay configured to maintain an open state when a voltage is applied and maintain a close state when no voltage is applied.

3. The forced discharge circuit according to claim 1, wherein the MCU outputs a LOW signal to the insulation control device when the function of the battery charger is stopped.

4. The forced discharge circuit according to claim 1, wherein the insulation control device is a photo coupler.

5. The forced discharge circuit according to claim 1, wherein the insulation control device is a pulse transformer.

6. The forced discharge circuit according to claim 1, further comprising a field effect transistor (FET) provided between the insulation control device and the relay to control a current flowing into the relay according to the current flow of the insulation control device.

7. A battery charger for an electric vehicle, comprising:
an AC power supply configured to supply commercial power;
a filter/rectifier configured to rectify the commercial power supplied from the AC power supply into a DC voltage;
a converter configured to convert the DC voltage output from the filter/rectifier into a voltage that is chargeable to a battery; and
a discharge circuit connected in parallel to the converter and configured to forcibly discharge a high voltage applied to the converter when input power is removed from the AC power supply;
wherein the discharge circuit comprises:
an micro control unit (MCU) configured to generate a control signal according to a charge state of the battery charger;
a discharge resistor connected in parallel to the battery charger;

a relay connected in series to the discharge resistor and configured to operate in an on or off state according to the control signal of the MCU; and an insulation control device provided between the MCU and the relay to control a current flow according to the control signal of the MCU.

8. The battery charger according to claim 7, wherein the relay is a normal close (NC) type relay configured to maintain an open state when a voltage is applied and maintain a close state when no voltage is applied.

9. The battery charger according to claim 7, wherein the MCU outputs a LOW signal to the insulation control device when the function of the battery charger is stopped.

10. The battery charger according to claim 7, wherein the insulation control device is a photo coupler.

11. The battery charger according to claim 7, wherein the insulation control device is a pulse transformer.

12. The battery charger according to claim 7, wherein the discharge circuit further comprises a field effect transistor (FET) provided between the insulation control device and the relay to control a current flowing into the relay according to the current flow of the insulation control device.

13. The battery charger according to claim 7, wherein the converter comprises:

a power factor correction circuit having a power factor correction function and configured to convert the power of the commercial power;

an line level control (LLC) converter configured to switch a current supplied from the power factor correction circuit through LLC to convert the current into a pulse signal; and a buck converter configured to convert the current output from the LLC converter into a voltage that is chargeable to a battery.

14. The battery charger according to claim 13, wherein the discharge circuit is connected in parallel between the filter/rectifier and the power factor correction circuit.

15. The battery charger according to claim 13, wherein the discharge circuit is connected in parallel between the power factor correction circuit and the LLC converter.

16. The battery charger according to claim 13, wherein the discharge charger is connected in parallel between the LLC converter and the buck converter.

17. The battery charger according to claim 13, wherein the discharge charger is connected in parallel between the buck converter and the battery.

18. In a control system of a battery charger for an electric vehicle, which controls a charging operation of the battery charger that is supplied with power from an electric vehicle supply equipment and charges a vehicle driving battery built in the electric vehicle, an electric vehicle including an onboard battery charger and having a charging function, the electric vehicle comprising:

an onboard battery charger built in the electric vehicle and configured to be supplied with power from the electric vehicle supply equipment to charge the battery; and the battery configured to be supplied with power from the onboard battery charger and be charged, wherein the onboard battery charger comprises:

an AC power supply configured to supply commercial power;

a filter/rectifier configured to rectify the commercial power supplied from the AC power into a DC voltage;

a converter configured to convert the DC voltage output from the filter/rectifier into a voltage that is chargeable to a battery; and a discharge circuit connected in parallel to the converter and configured to forcibly discharge a high voltage applied to the converter when input power is removed from the AC power supply, wherein the discharge circuit comprises:

an micro control unit (MCU) configured to generate a control signal according to a charge state of the battery charger;

a discharge resistor connected in parallel to the battery charger;

a relay connected in series to the discharge resistor and configured to operate in an on or off state according to the control signal of the MCU;

an insulation control device provided between the MCU and the relay to control a current flow according to the control signal of the MCU; and a field effect transistor (FET) provided between the insulation control device and the relay to control a current flowing into the relay according to the current flow of the insulation control device.

\* \* \* \* \*